US007843600B2

(12) United States Patent
Ohga (10) Patent No.: US 7,843,600 B2
(45) Date of Patent: Nov. 30, 2010

(54) INFORMATION PROCESSING APPARATUS

(75) Inventor: Manabu Ohga, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1209 days.

(21) Appl. No.: 10/672,702

(22) Filed: Sep. 25, 2003

(65) Prior Publication Data

US 2004/0061912 A1    Apr. 1, 2004

(30) Foreign Application Priority Data

Sep. 27, 2002  (JP)  ............................ 2002-283385

(51) Int. Cl.
G03F 3/10  (2006.01)
(52) U.S. Cl. ........................................ 358/1.9; 358/529
(58) Field of Classification Search .................. 358/1.9, 358/3.23, 3.24, 500, 512, 529, 528; 345/590, 345/589
See application file for complete search history.

(56) References Cited

U.S. PATENT DOCUMENTS 4,551,751 A * 11/1985 Jung ........................... 358/500
4,590,515 A * 5/1986 Wellendorf .................. 358/500
5,113,252 A * 5/1992 Horie et al. .................. 358/528
6,281,984 B1 * 8/2001 Decker et al. ................ 358/1.9
6,775,030 B2 * 8/2004 Krabbenhoft et al. ........ 358/1.9
6,956,580 B2 * 10/2005 Rozzi .......................... 345/589
2002/0159081 A1* 10/2002 Zeng .......................... 358/1.9
2003/0025924 A1* 2/2003 Lammens et al. ............ 358/1.9

* cited by examiner

Primary Examiner—King Y Poon
Assistant Examiner—Lennin R Rodriguez
(74) Attorney, Agent, or Firm—Canon U.S.A., Inc. I.P. Division (57) ABSTRACT

In an information processing method, input color data indicating a plurality of color components including a black color component is converted into output color data that indicates a plurality of color components including a black color component. A relationship between lightness levels and simple black colors is determined for an output device based on the characteristics of the output device. When input color data indicates a simple black color, output color data for the simple black color having a lightness level equivalent to the lightness level of the input color data is determined based on the relationship between lightness levels and simple black colors.

4 Claims, 6 Drawing Sheets

BLACK-PRINTING COMPENSATION

RGB INPUT :
- ☑ CHARACTERS
- ☑ VECTOR IMAGES
- ☐ RASTER IMAGES

CMYK INPUT :
- ☑ CHARACTERS
- ☐ VECTOR IMAGES
- ☐ RASTER IMAGES

INFORMATION PROCESSING APPARATUS

BACKGROUND OF THE INVENTION

1. Field of the Invention

The present invention relates to an information processing apparatus for converting input color data indicating an achromatic color into output color data indicating a simple black color.

2. Description of the Related Art

Figure 1:
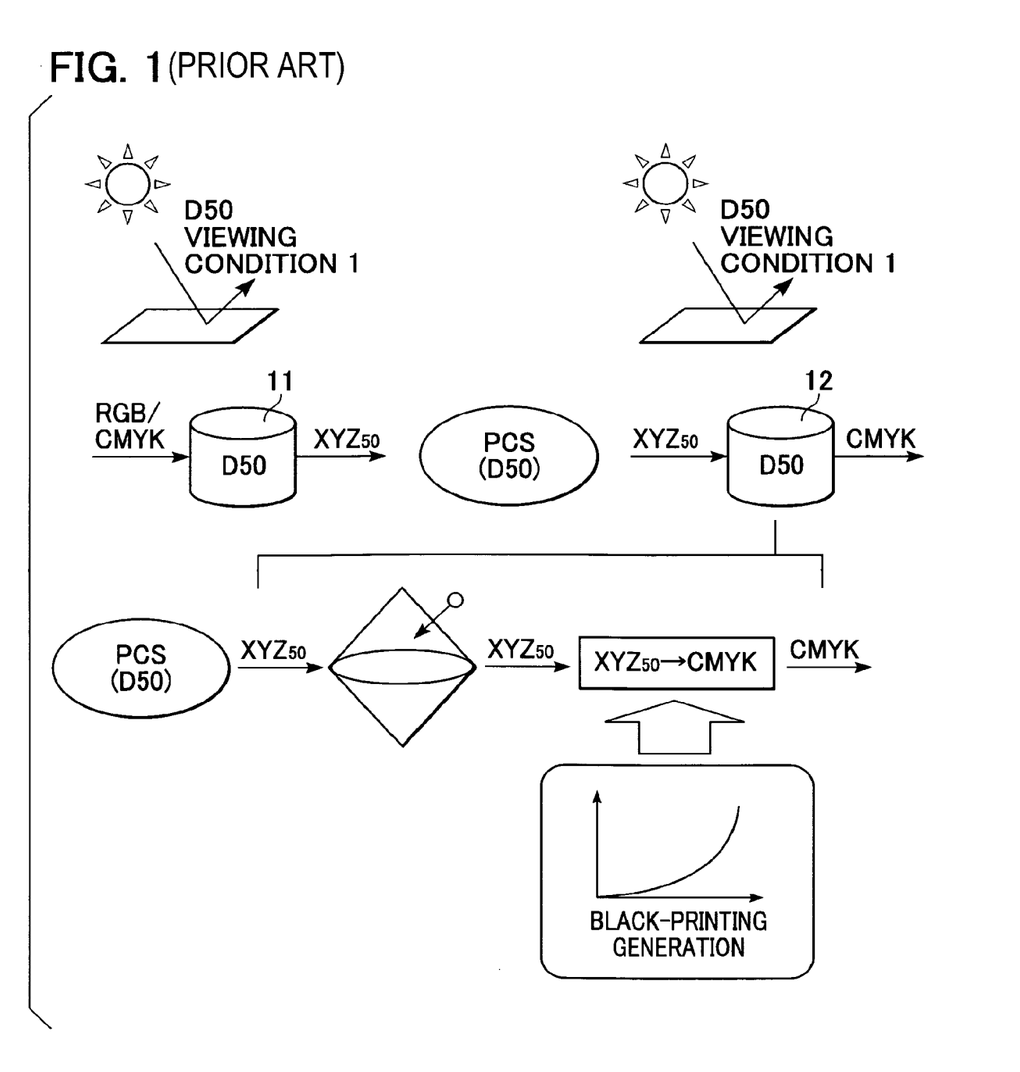
FIG. 1 schematically illustrates normal color matching between different devices.

FIG. 1 schematically illustrates color matching between different devices.

Input data, such as RGB data or CMYK data, is converted into XYZ data in a device-independent color space by using an input profile. Colors outside the color reproduction range of an output device cannot be reproduced by the output device. Accordingly, color-space compression is performed on the input data that has been converted into device-independent color-space data so that the input colors can be contained within the color reproduction range. After color-space compression, the input data is converted from the device-independent color space into CMYK data in a device-dependent color space.

In color matching, a reference white point and the ambient light are fixed. For example, in the profiles defined by the International Color Consortium (ICC), the Profile Connection Space (PCS) for connecting the profiles is set to D50-standard XYZ values and Lab values.

However, when the same sample (for example, an image) is observed under different light sources, the XYZ values obviously become different between the different light sources. To predict XYZ values under different light sources, there are conversion methods such as (1) ratio conversion, (2) Von Kries conversion, and (3) prediction equations using color perception models.

In the ratio conversion method, a ratio conversion W2/W1 is performed for converting the XYZ values under a reference white point W1 into XYZ values under a reference white point W2. When this conversion method is applied to the Lab uniform color space, the Lab values under W1 and the Lab values under W2 coincide with each other. For example, when the XYZ values of a sample under W1 $(X_{w1}, Y_{w1}, Z_{w1})$ are $(X1, Y1, Z1)$, and when the XYZ values of a sample under W2 $(X_{w2}, Y_{w2}, Z_{w2})$ are $(X2, Y2, Z2)$, the following relationships are obtained by the ratio conversion.

$$X2 = (X_{w2}/X_{w1}) \cdot X1$$

$$Y2 = (Y_{w2}/Y_{w1}) \cdot Y1$$

$$Z2 = (Z_{w2}/Z_{w1}) \cdot Z1 \quad (1)$$

In the Von Kries conversion method, the ratio conversion W2'/W1' in a human color perception space PQR is performed for converting the XYZ values under W1 into XYZ values under W2. When this conversion method is applied to the Lab uniform space, the Lab values under W2 and the Lab values under W1 do not coincide with each other. For example, when the XYZ values of a sample under W1 $(X_{w1}, Y_{w1}, Z_{w1})$ are $(X1, Y1, Z1)$, and when the XYZ values of a sample under W2 $(X_{w2}, Y_{w2}, Z_{w2})$ are $(X2, Y2, Z2)$, the following relationships are obtained by the Von Kries conversion.

$$\begin{bmatrix} X2 \\ Y2 \\ Z2 \end{bmatrix} = [M^{-1}] \begin{bmatrix} P_2/P_1 & 0 & 0 \\ 0 & Q_2/Q_1 & 0 \\ 0 & 0 & R_2/R_1 \end{bmatrix} [M] \begin{bmatrix} X1 \\ Y1 \\ Z1 \end{bmatrix} \quad (2)$$

where, $$\begin{bmatrix} P_1 \\ Q_1 \\ R_1 \end{bmatrix} = [M] \begin{bmatrix} X_{w1} \\ Y_{w1} \\ Z_{w1} \end{bmatrix}$$

$$\begin{bmatrix} P_2 \\ Q_2 \\ R_2 \end{bmatrix} = [M] \begin{bmatrix} X_{w2} \\ Y_{w2} \\ Z_{w2} \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

According to the prediction equation using color perception models, conversion is performed by using a human color perception space QMH (or JCH), such as CIECAM97s, for converting the XYZ values under viewing condition VC1 (including W1) into XYZ values under viewing condition VC2 (including W2). In QMH, Q indicates the brightness, M represents the colorfulness, and H designates the hue-quadrature or hue-angle, respectively. In JCH, J indicates the lightness, C represents the chroma, and H designates the hue-quadrature or hue-angle. When this conversion method is applied to the Lab uniform color space, the Lab values under W1 and the Lab values under W2 do not coincide with each other, as in the Von Kries conversion method. For example, when the XYZ values of a sample under W1 $(X_{w1}, Y_{w1}, Z_{w1})$ are $(X1, Y1, Z1)$, and when the XYZ values of a sample under W2 $(X_{w2}, Y_{w2}, Z_{w2})$ are $(X2, Y2, Z2)$, the following conversion is performed by using the color perception models.

$$X1, Y1, Z1) \rightarrow [\text{CIECAM97s forward conversion}] \rightarrow \\ (Q, M, H) \text{ or } (J. C, H) \rightarrow [\text{CIECAM97s inverse conversion}] \rightarrow (X2, Y2, Z2) \quad (3)$$

Figure 2:
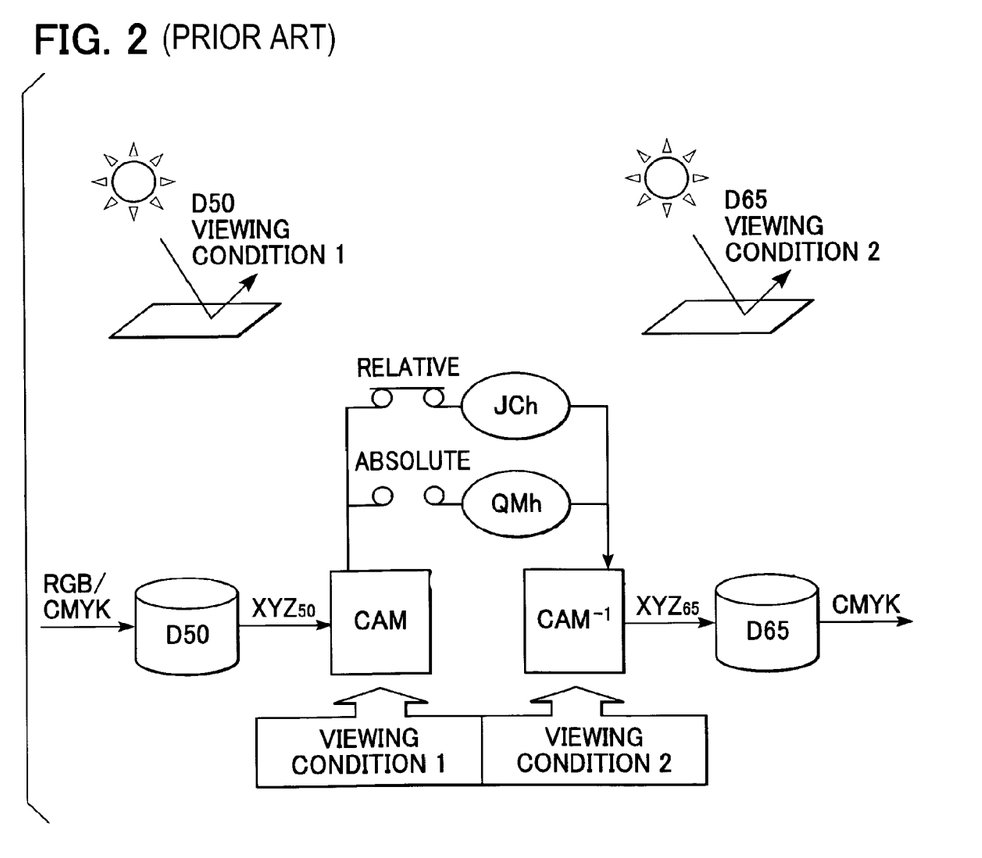
FIG. 2 schematically illustrates color matching under different viewing conditions.

An example of color matching implemented under different viewing conditions by using color perception models is shown in FIG. 2.

As shown in FIGS. 1 and 2, color matching between different devices can be achieved by using device-independent XYZ values (or Lab values). However, when converting XYZ values into CMYK values, the black-printing (K-printing) generation characteristic must be fixed so as to obtain one K value since a plurality of combinations of CMY values and K values are available for single XYZ values.

If the black-printing generation characteristic is fixed, a combination of CMY value and the K value can be uniquely determined for the XYZ value. However, when converting CMYK values into CMYK values, even if the combination of the input CMY values and K value is changed, such a change cannot be reflected in the resulting output data since the black-printing generation characteristic is fixed. For example, it is now assumed that CMYK values A1' are output in response to input CMYK values A1. In this case, even if CMYK values A2, which represent the same color as the CMYK values A1, are input by increasing the CMY values and by decreasing the K value, the resulting output data remains the same as the CMYK values A1' in accordance with the fixed black-printing generation characteristic since the XYZ values are the same.

For the same reason, when a gray color is output in response to input CMYK values, even if the simple K color (0, 0, 0, K) is input, the resulting output data does not become a simple K color (0, 0, 0, K').

In the field of graphic art, characters in CMYK values are in many cases represented by a simple K color. It is thus desirable that an input simple K color be output as a simple K color.

Additionally, it is desirable that a simple K color be output in response to input RGB values (when R=G=B).

SUMMARY OF THE INVENTION

In view of the above background, it is an object of the present invention to reproduce a simple K color when input data is an achromatic color.

To achieve the above-described object, according to one aspect of the present invention, there is provided an information processing method for converting input color data indicating a plurality of color components including a black color component into output color data that indicates a plurality of color components including a black color component. The information processing method includes: determining the relationship between lightness levels and black colors based on characteristics of an output device; and determining, when the input color data indicates a simple black color, output color data for a simple black color having a lightness level equivalent to the lightness level of the input color data based on the determined relationship between lightness levels and simple black colors.

According to another aspect of the present invention, there is provided an information processing method for converting input color data into output color data that indicates a plurality of color components including a black color component. The information processing method includes: determining a relationship between lightness levels and black color based on characteristics of an output device; and determining, when the input color data indicates an achromatic color, output color data for black color having a lightness level equivalent to a lightness level of the input color data based on the relationship between lightness levels and black color.

According to a further aspect of the present invention, there is provided a program for implementing an information processing method for converting input color data indicating a plurality of color components including a black color component into output color data that indicates a plurality of color components including a black color component. The program implements: determining a relationship between lightness levels and black color based on characteristics of the output device; and determining, when the input color data indicates black color, output color data for the black color having a lightness level equivalent to a lightness level of the input color data based on the relationship between lightness levels and black color.

According to a yet further aspect of the present invention, there is provided a program for implementing an information processing method for converting input color data into output color data that indicates a plurality of color components including a black color component. The program implements: determining a relationship between lightness levels and black color based on characteristics of the output device; and determining, when the input color data indicates an achromatic color, output color data for black color having a lightness level equivalent to a lightness level of the input color data based on the relationship between lightness levels and black color.

According to a further aspect of the present invention, there is provided an information processing apparatus for converting input color data indicating a plurality of color components including a black color component into output color data that indicates a plurality of color components including a black color component. The information processing apparatus includes: a first section arranged to determine a relationship between lightness levels and black color based on characteristics of an output device; and a second section arranged to determine, when the input color data indicates black color, output color data for black color having a lightness level equivalent to a lightness level of the input color data based on the relationship between lightness levels and black color.

According to a further aspect of the present invention, there is provided an information processing apparatus for converting input color data into output color data that indicates a plurality of color components including a black color component. The information processing apparatus includes: a first section arranged to determine a relationship between lightness levels and black color based on characteristics of an output device; and a second section arranged to determine, when the input color data indicates an achromatic color, output color data for black color having a lightness level equivalent to a lightness level of the input color data based on the relationship between lightness levels and black color.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An embodiment of the present invention is described below with reference to FIGS. 3 through 5.

AToBxTag and BToAxTag are tags used to performing color conversion between PCS and device dependent space. In this embodiment, they are used when converting Src_CMYK values into Dst_CMYK values, as well as when black-printing compensation is performed for a printer. AToBxTag is represented by a look-up table (LUT) in which color conversion from a device-dependent color space into PCS is indicated. BToAxTag is represented by an LUT in which color conversion from PCS into a device-dependent color space is indicated.

Figure 4:
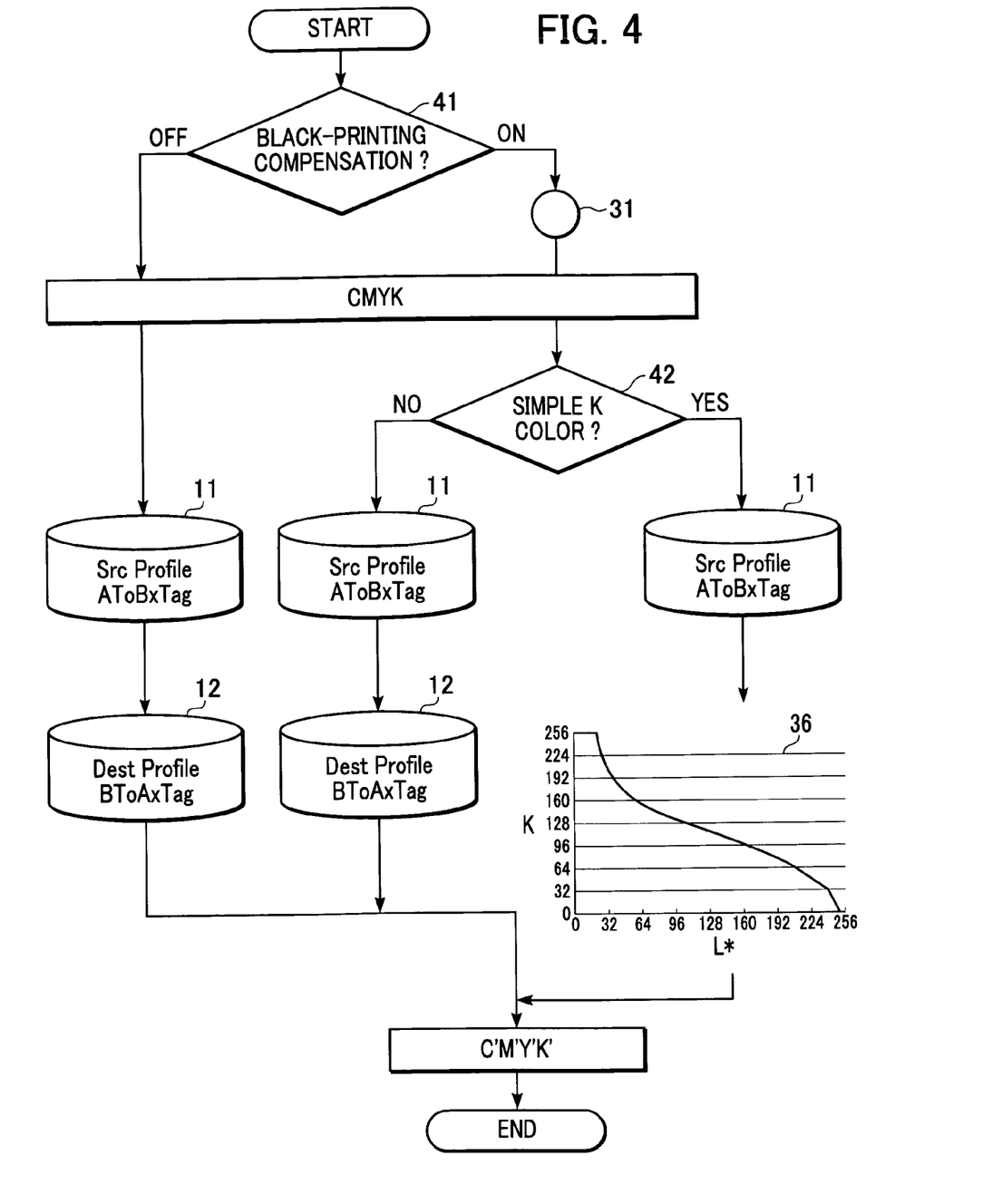
FIG. 4 illustrates color-matching processing when CMYK values are input.

Color conversion according to this embodiment is indicated by the flowchart of FIG. 4.

It is first determined whether black-printing compensation is ON or OFF (such a step is indicated by 41 in FIG. 4).

If black-printing compensation is OFF, the Src_CMYK values (CMYK values dependent on a source device) are converted into the Dst_CMYK values (CMYK values dependent on a destination device), as in the color matching shown in FIG. 1, by using the AToBxTag of a source profile 11 and the BToAxtag of a destination profile 12. In this case, even when a simple K color is input, a non simple K color is output. That is, CMYK values (other than values for a simple K color) determined by the fixed black-printing generation characteristic are output.

If black-printing compensation is ON, initializing processing 31 for black-printing compensation is performed. The initializing processing 31 is described in detail below with reference to FIG. 3.

Figure 3:
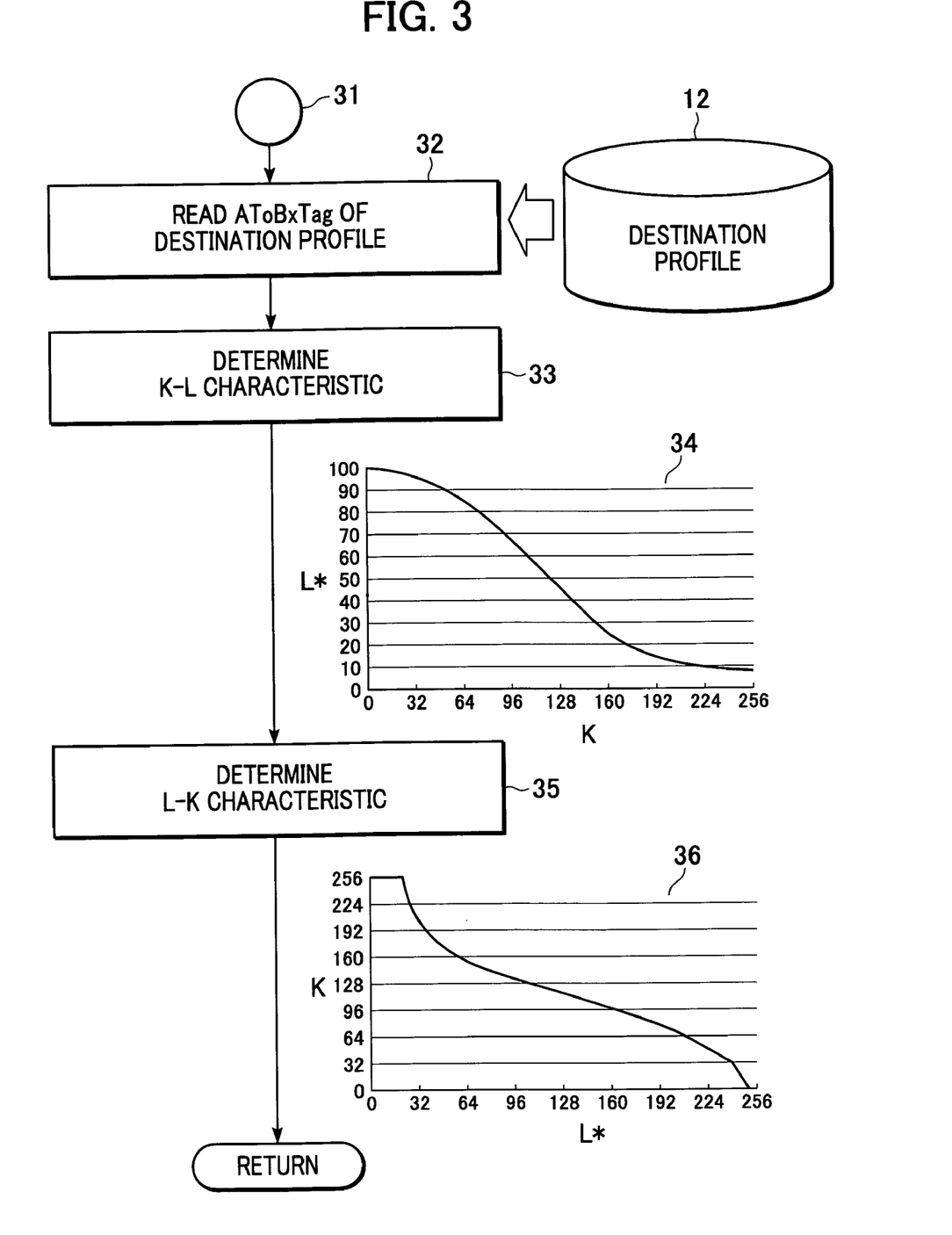
FIG. 3 illustrates initializing processing for determining an L-K characteristic.

The AToBxTag is read from the destination CMYK profile 12 (such a step is indicated by 32 in FIG. 3). In the AToBxTag, color conversion from the CMYK values of the destination device into the PCS (for example, conversion from CMYK values into Lab values) is indicated in an LUT.

Then, by inputting a pseudo simple K color (0, 0, 0, K) (for example, K=0 to 255) as color conversion input of the AToBxTag, Lab values in response to the simple K color (K=0 to 255) are obtained. In this case, since the only item required is the L* value (lightness information), a* and b* are ignored (if the PCS is indicated by XYZ values, the XYZ values are converted into Lab values). According to the relationship between a simple K value (0, 0, 0, K) (for example, K=0 to 255) and the corresponding L* value, a K-L characteristic indicated by a graph 34 is obtained (such a step is indicated by 33 in FIG. 3).

Then, inverse conversion is performed on the K-L characteristic (graph 34), resulting in an L-K characteristic (graph 36) (such a step is indicated by 35). The L-K characteristic indicates the simple K value corresponding to the lightness L*.

According to the above-described initializing processing 31, a table for determining the K value required for reproducing a certain L* value as a simple K color can be formed.

After the initializing processing 31 for black-printing compensation, it is determined whether each component of the input Src_CMYK value is a simple K color, that is, whether the input color data is an achromatic color.

If the input Src_CMYK values indicate that C!=0, M!=0, or Y!=0, that is, if any one of the C, M, and Y components is not 0, it is determined that the input CMYK values do not indicate a simple K color, and the Src_CMYK values are converted into the Dst_CMYK values, as in the color matching shown in FIG. 1, by using the AToBxTag of the source profile 11 and the BToAxTag of the destination profile 12.

However, if the input Src_CMYK values indicate that C=M=Y=0, it is determined that the Src_CMYK values are a simple K color 42.

Conversion processing is performed on the simple K color by using the AToBxTag of the source profile 11 and the L-K characteristic 36 which is obtained by the initializing processing 31 for black-printing compensation. More specifically, the Lab values (or XYZ values) for the simple K color of the source device is obtained by using the AToBxTag, and the simple K color of the destination device can be obtained by referring to the L-K characteristic 36 by using the L value of the Lab values (if the PCS is indicated by XYZ values, the XYZ values are converted into Lab values).

As described above, when black-printing compensation is ON, in response to the Src_CMYK values indicating a simple K color, the Dst_CMYK values indicating a simple K color can be output, while maintaining lightness. As a result, when characters indicate a simple K color, a corresponding simple K color can be reproduced, which is desirable in the field of graphic art.

A description will now be provided of black-printing compensation when Src_RGB values are converted into Dst_CMYK values during the color conversion process.

When the source profile is a monitor profile, a 3×3 matrix and a gamma characteristic for converting a device-dependent color into PCS are stored therein. The process for this type of color conversion is indicated by the flowchart of FIG. 5.

The process steps are similar to those of FIG. 4 (color conversion from CMYK values into CMYK values). However, instead of determining whether the CMYK values are a simple K color, it is determined whether R=G=B (such a step is indicated by 52 in FIG. 4). That is, it is determined whether the input color data is an achromatic color.

As described above, the 3×3 matrix and the gamma characteristic are stored in the source profile 11. Device RGB values are converted into linear RGB values by the gamma characteristic, and the linear RGB values are converted into XYZ values by the 3×3 matrix.

Black-printing compensation when Src_CMYK values/RGB values are converted into Dst_CMYK values while considering the viewing conditions will now be described.

Figure 5:
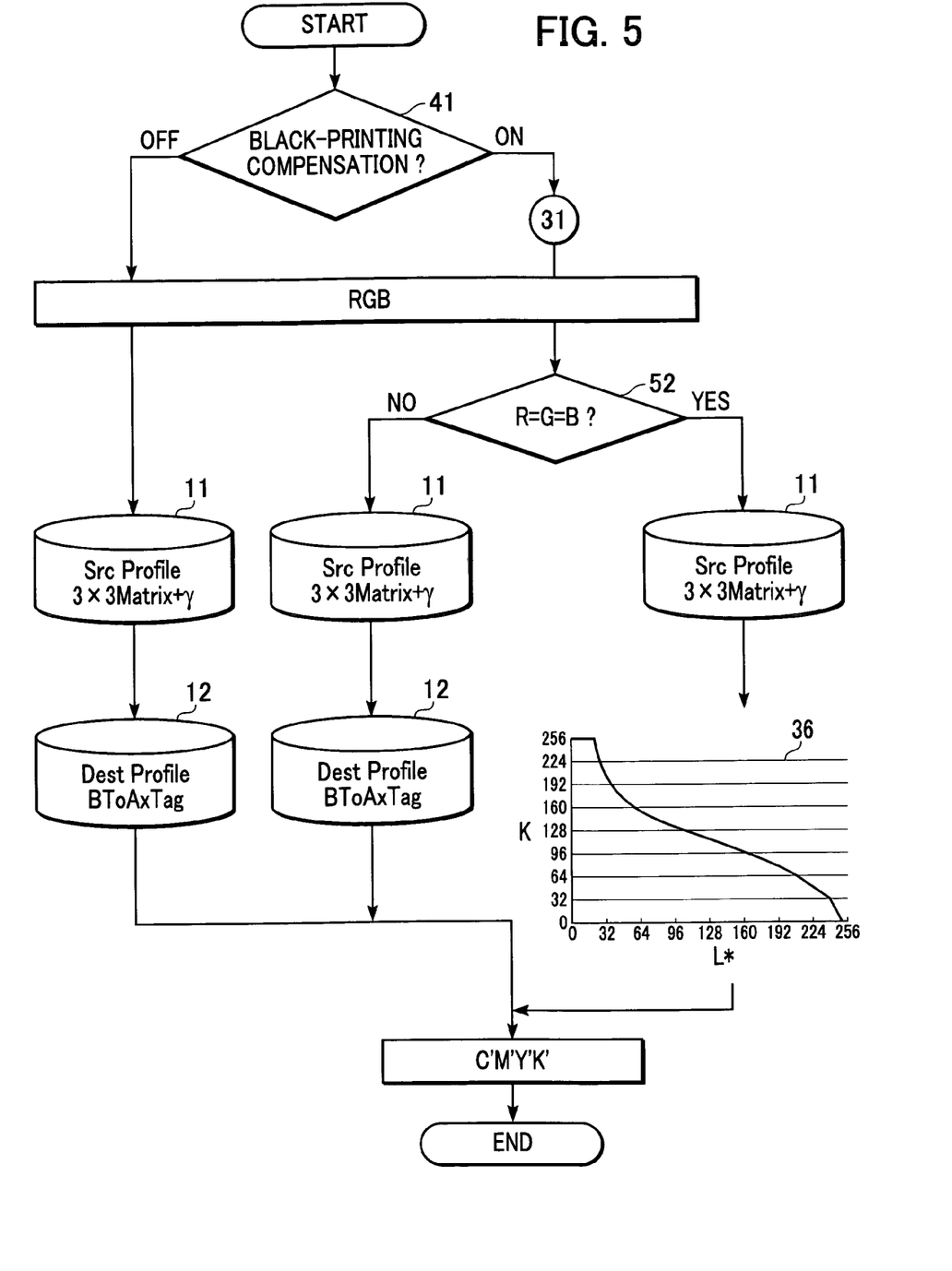
FIG. 5 illustrates color-matching processing when RGB values are input.

In this case, although the basic process flow is similar to FIGS. 3, 4, and 5, the viewing conditions must be considered in the initializing processing 31 for black-printing compensation and in the processing for the source profile 11 and the destination profile 12.

In black-printing compensation, viewing conditions, which are used as a reference (for example, a subject is viewed in an office under D50), are set in advance. Then, by considering the viewing conditions when determining the K-L characteristic 34 in the initializing processing 31, the color perception models are applied from the viewing conditions set in the destination profile so that the L value under the reference viewing conditions is determined.

When processing a simple K value or a gray value (R=G=B), the L value under the reference viewing conditions which are set when determining the K-L characteristic 34 is determined from the viewing conditions stored in the source profile by the color perception models, and a simple K color is obtained by applying the L-K characteristic 36 under the reference viewing conditions which are determined in the initializing processing 31.

When black-printing compensation is OFF, or when the input color is other than a simple K color or other than R=G=B, the viewing conditions can be considered by applying processing similar to that shown in FIG. 2.

When performing color matching from input RGB values or CMYK values into CMYK values according to the above-described processing, in response to a simple K value or a gray value (R=G=B), a simple K value can be output while maintaining lightness by using color perception models, such as CIECAM 97s, while taking the viewing conditions into consideration.

It is to be understood that various modifications can be made to the above-described embodiment.

A determination as to whether black-printing compensation is applied may be independently made in a color matching function (MatchColors) for a color list or in a color matching function (MatchPixmap) in a raster image.

Figure 6:
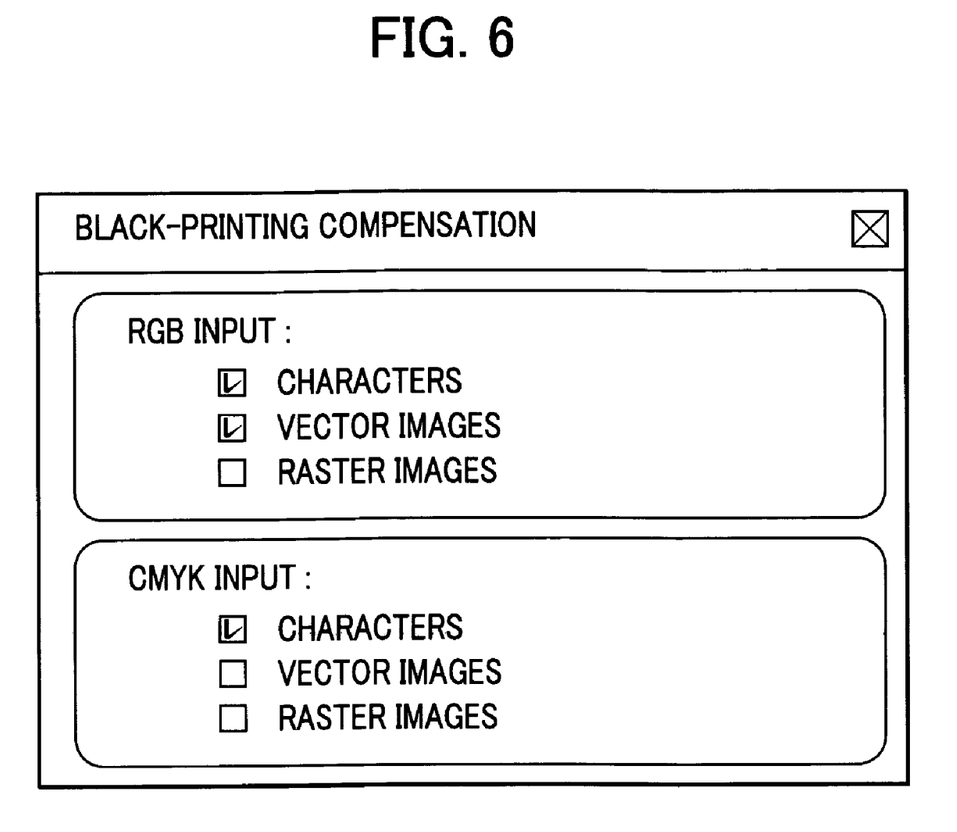
FIG. 6 illustrates an example of a user interface.

Alternatively, a determination as to whether black-printing compensation is applied when performing color matching may be made via a user interface. For example, as shown in FIG. 6, it may be determined whether black-printing compensation is performed for individual items, such as characters, vector images, and raster images input in the form of RGB, and for individual items, such as characters, vector images, and raster images input in the form of CMYK.

Black-printing compensation can be turned ON by checking a corresponding check box. Black-printing compensation is effective only when color matching is performed from input RGB values into CMYK values and from input CMYK values into CMYK values.

According to the above-described modified example, in performing color matching from RGB values or CMYK values into CMYk values, a determination as to whether a simple K color is output in response to a simple K color or a gray color (R=G=B) can be made independently for each item, such as a color list and a raster image. As a result, processing for outputting the simple K color can be controlled in units of objects, such as characters, vector images, and raster images.

Although in the above-described embodiment a CMYK device is used as the output device, the present invention can be applied to N number of colors including K, such as six colors consisting of CMYK, light C, and light M, and six colors consisting of CMYK, orange, and violet.

In the present invention, software program code for implementing the functions of the above-described embodiment may be supplied via a network.

In this case, the software program code itself implements the functions of the above-described embodiment, and thus, the program code itself and means for supplying the program code to a computer constitute the present invention.

The functions of the foregoing embodiment can be implemented not only by running the program code read by the computer, but also by executing processing by, for example, an operating system (OS) or another application software program running in the computer in cooperation with the program code. In this case, the present invention encompasses the program code.

As many apparently widely different embodiments of the present invention can be made without departing from the spirit and scope thereof, it is to be understood that the invention is not limited to the specific embodiments thereof except as defined in the appended claims.

What is claimed is:

1. An information processing method performed by an information processing apparatus including a processor, for converting input color data including a plurality of color component data and black component data into output color data including a plurality of color component data and black component data, the input color data being dependent on a source device and the output color data being dependent on a destination device, the information processing method comprising:
   obtaining a source profile corresponding to the source device and a destination profile corresponding to the destination device, wherein the destination profile includes a first color conversion from a device dependent color space into a device-independent color space and a second color conversion from a device-independent color space into a device dependent color space;
   determining whether a black-printing compensation is applied;
   obtaining a relationship between lightness levels and black color based on the first color conversion of the destination profile;
   determining whether the input color data indicates a simple black color;
   outputting, by the processor, in a first case that the black-printing compensation is applied and the input color data indicates a simple black color, color data for the simple black color having a lightness level equivalent to a lightness level of the input color data, based on the source profile and the obtained relationship between lightness levels and black color;
   outputting, by the processor, in a second case that the black-printing compensation is not applied, color data by using the source profile and the second color conversion of the destination profile without using the obtained relationship between lightness levels and black color; and
   outputting, by the processor, in a third case that the black-printing compensation is applied and the input color does not indicate the simple black color, color data by using the source profile and the second color conversion of the destination profile without using the obtained relationship between lightness levels and black color,
   wherein a value of the plurality of color component data included in the input color data determined as the simple black color is 0.

2. An information processing method according to claim 1, wherein the obtaining of the relationship between lightness levels and black color includes:
   generating, by converting the plurality of the simple black color by using the destination profile, a first conversion condition for converting the black color into the lightness level; and
   performing an inverse conversion process on the first conversion condition.

3. A computer-readable storage medium having stored thereon a program for implementing an information processing method for converting input color data including a plurality of color component data and black component data, the input color data being dependent on a source device and the output color data being dependent on a destination device, the program implementing:
   obtaining a source profile corresponding to the source device and a destination profile corresponding to the destination device, wherein the destination profile includes a first color conversion from a device dependent color space into a device-independent color space and a second color conversion from a device-independent color space into a device dependent color space;
   determining whether a black-printing compensation is applied;
   obtaining a relationship between lightness levels and black color based on the first color conversion of the destination profile;
   determining whether the input color data indicates a simple black color;
   outputting, in a first case that the black-printing compensation is applied and the input color data indicates a simple black color, color data for the simple black color having a lightness level equivalent to a lightness level of the input color data based on the source profile and the obtained relationship between lightness levels and black color;
   outputting, in a second case that the black-printing compensation is not applied, color data by using the source profile and the second color conversion of the destination profile without using the obtained relationship between lightness levels and black color; and
   outputting, in a third case that the black-printing compensation is not applied or when the black-printing compensation is applied and the input color data does not indicate the simple black color, color data by using the source profile and the second color conversion of the destination profile without using the obtained relationship between lightness levels and black color, wherein a value of the plurality of color component data included in the input color data determined as the simple black color is 0.

4. An information processing apparatus for converting color data including a plurality of color component data and black component data into output color data including a plurality of color component data and black component data, the input color data being dependent on a source device and the output color data being dependent on a destination device, the information processing apparatus comprising:

a first section arranged to obtain a source profile corresponding to the source device and a destination profile corresponding to the destination device, wherein the destination profile includes a first color conversion from a device dependent color space into a device-independent color space and a second color conversion from a device-independent color space into a device dependent color space;

a second section arranged to determine whether a black-printing compensation is applied;

a third section arranged to obtain a relationship between lightness levels and black color based on the first color conversion of the destination profile;

a fourth section arranged to output, in a first case that the black-printing compensation is applied and the input color data indicates a simple black color, color data for the simple black color having a lightness level equivalent to a lightness level of the input color data, based on the source profile and the obtained relationship between lightness levels and black color;

a fifth section arranged to output, in a second case that the black-printing compensation is not applied, color data by using the source profile and the second color conversion of the destination profile without using the obtained relationship between lightness levels and black color; and a sixth second arranged to output, in a third case that the black-printing compensation is applied and the input color data does not indicate the simple black color, color data by using the source profile and the second color conversion of the destination profile without using the obtained relationship between lightness levels and black color, wherein a value of the plurality of color component data included in the input color data determined as the simple black color is 0.

* * * * *